Jan. 31, 1961 M. E. KECK 2,970,208
LUMINAIRE OPTICAL SYSTEM
Filed July 26, 1957 3 Sheets-Sheet 1

WITNESSES
Edwin E. Bander
James F. Young

INVENTOR
Merle E. Keck
BY
Donald Smith
ATTORNEY

Jan. 31, 1961 M. E. KECK 2,970,208
LUMINAIRE OPTICAL SYSTEM
Filed July 26, 1957 3 Sheets-Sheet 2
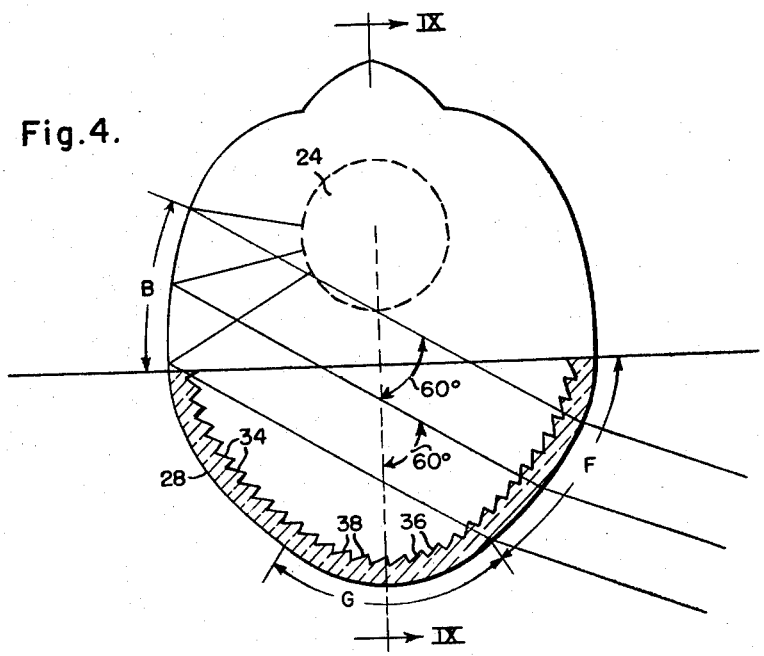
Fig.4.
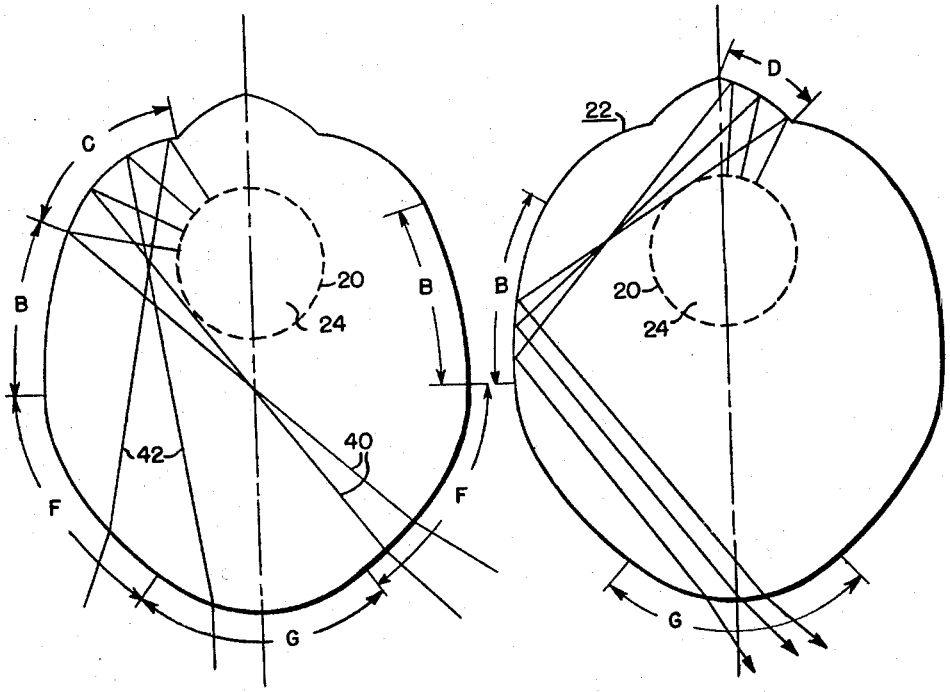
Fig.5.
Fig.6.

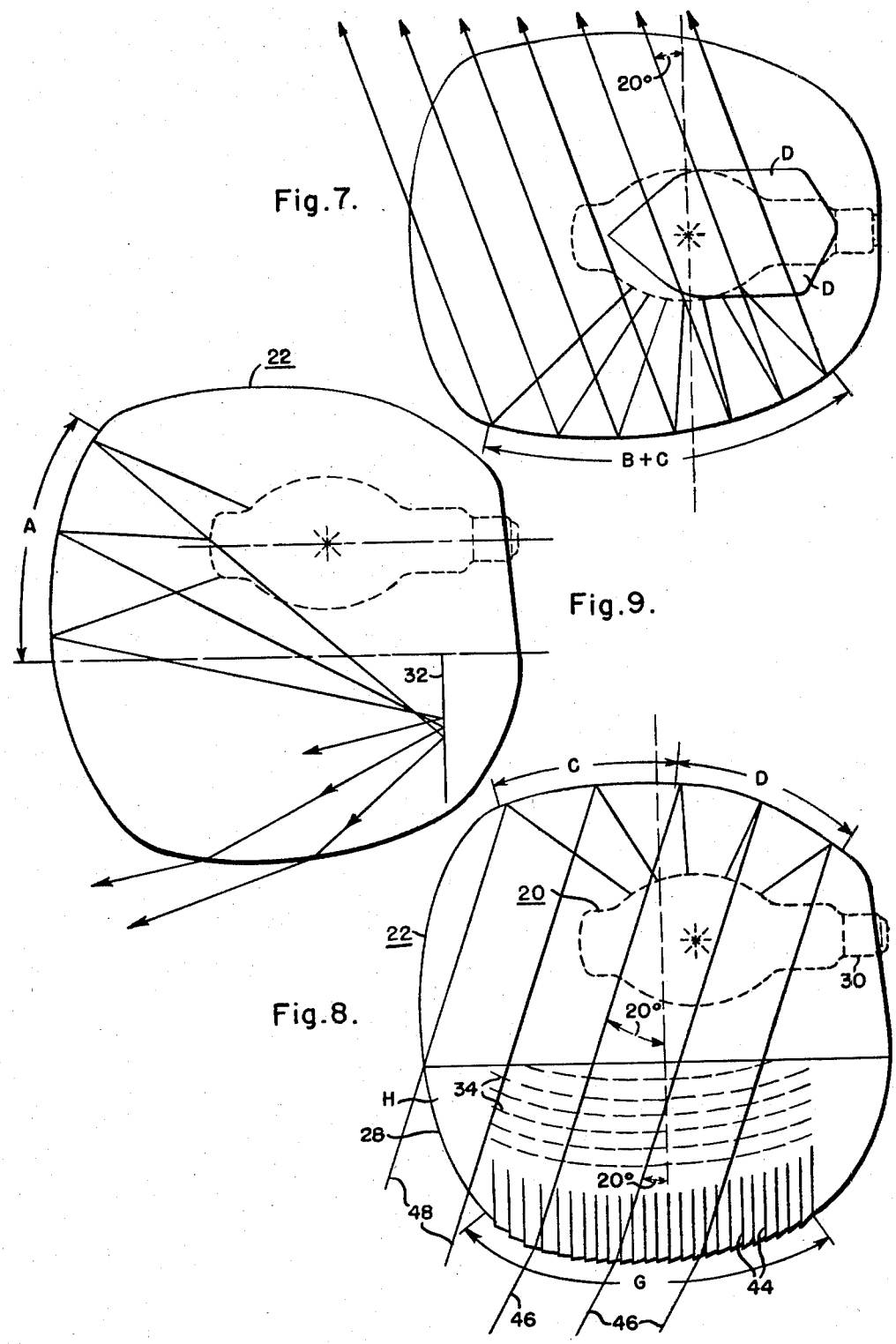

United States Patent Office 2,970,208
Patented Jan. 31, 1961

2,970,208
LUMINAIRE OPTICAL SYSTEM

Merle E. Keck, Bay Village, Ohio, assignor to Westinghouse Electric Corporation, East Pittsburgh, Pa., a corporation of Pennsylvania Filed July 26, 1957, Ser. No. 674,396

4 Claims. (Cl. 240—25)

The invention forming the subject of the present disclosure relates to a luminaire and more particularly to the optical system of a luminaire of the class described adapted for use in street-lighting applications.

When utilizing the aforesaid luminaires, particularly for street-lighting applications, it is necessary to minimize the spill lighting of areas off the roadway which is intended to be lighted and to redistribute this light usefully along the length and width of the roadway. For this reason, it is essential, obviously, to obtain a maximum of output from the lighting fixture, particularly when employing a relatively large, low brightness source. In other applications, wherein the street lights are confined for the most part to one side of the roadway, it is frequently desirable to obtain relatively uniform lighting therefrom of areas across the roadway. At the same time, it is equally desirable to obtain uniform lighting along the length of the roadway without too closely spacing the individual lighting fixtures.

These problems have been complicated with the advent of so-called "daylight" fixtures utilizing, for example, color-corrected mercury fluorescent lights. When using such lamps, which are relatively large lighting sources, it is necessary to design the refractor and reflector usually employed with fixtures of this nature in order to obtain maximum output which at the same time is distributed uniformly over the illuminated area, by arranging the aforesaid reflector and refractor in such a manner that substantially all of the light produced by the source is emitted from the luminaire without being absorbed by or passed through the lamp or lighting source.

In view of the foregoing, an object of the present invention is to provide a novel and efficient optical system for a lighting fixture or luminaire.

Another object of the invention is to provide means associated with the aforesaid luminaire for minimizing the absorption of light by the lighting source therefor.

A further object of the invention is to provide a luminaire of the character described with means for ensuring a uniform output therefrom over a given area.

Still another object of the invention is to provide a luminaire adapted for street lighting or roadway usage and having means associated therewith for reducing or eliminating spill lighting emitted therefrom.

Yet another object of the invention is to provide luminaire adapted for roadway usage and having means associated therewith, when the luminaire is disposed adjacent one side of the roadway, for furnishing adequate lighting to those areas of the roadway opposite the luminaire.

Another object of the invention is to provide a luminaire adapted for street lighting use with means for ensuring adequate lighting along the length of the street.

These and other objects, features and advantages of the invention will be made apparent during the ensuing description of exemplary forms of the invention with the description being taken in conjunction with the accompanying drawings wherein:

Fig. 4 illustrates in outline a cross-section of the reflecting system of Fig. 1 taken substantially along reference lines IV—IV thereof and showing in addition, a cross-sectional view of the refractor illustrated in Fig. 8 of the drawings;

Fig. 5 is another outline view of a cross-section of the reflector taken along reference lines IV—IV of Fig. 1 and showing schematically the refractor of Fig. 8;

Fig. 6 is an outline or schematic view identical to that of Fig. 5 but illustrating ray traces from a different part of the reflector;

Fig. 7 is another top plan view of the reflector system illustrated in Figs. 1 to 3 of the drawings and showing ray traces of light reflected from sections B and C of the reflector;

Fig. 8 is a side elevational view of the reflector system of Fig. 1 of the drawings shown in conjunction with a refractor arranged in accordance with the invention; and Fig. 9 illustrates in outline a longitudinally sectional view of the reflector and refractor arrangement shown in Fig. 4 of the drawings and taken along reference lines IX—IX thereof.

In accordance with the invention, a lighting reflector is provided which, when arranged with a refractor in accordance with the invention is adapted for distributing light uniformally over a given area. The aforesaid reflector is so arranged with discrete reflecting areas such that substantially all the light received thereby from a relatively large source is directed out of this area without passing through the lighting source or being absorbed thereby. Auxiliary reflecting means likewise contemplated by the invention are provided for directing a portion of the light produced by this source to a selected portion of the area illuminated thereby.

Figure 1:
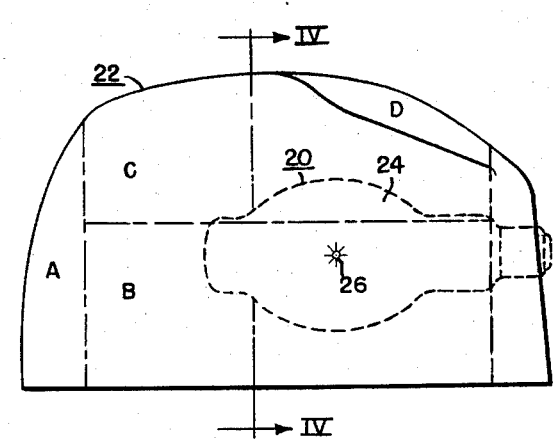
Figure 1 is a side elevational view of a reflector system arranged in accordance with the invention and adapted for use in conjunction with a lighting fixture of the character described.
Figure 2:
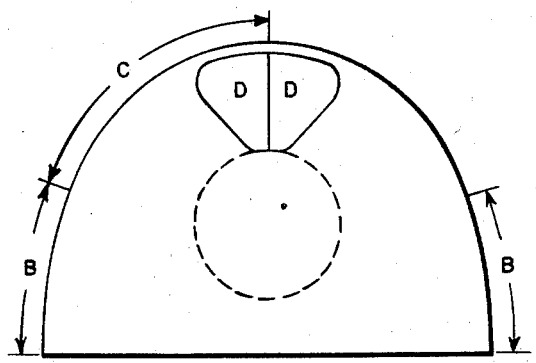
Fig. 2 is an inner end elevational view of the reflector system illustrated in Fig. 1.
Figure 3:
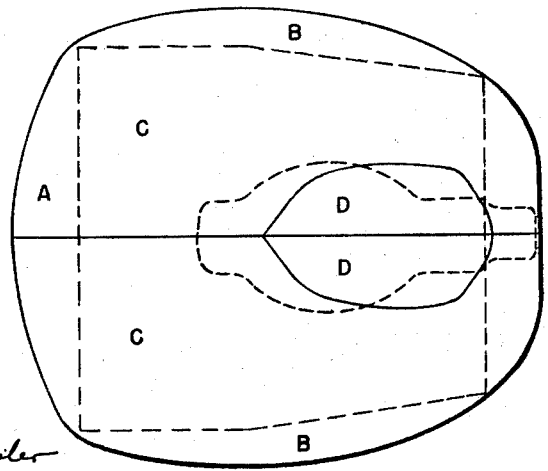
Fig. 3 is a top plan view of the reflector system shown in Fig. 1.

Referring now more particularly to Figs. 1 to 3 of the invention, the illustrative form of the invention shown therein is arranged for use with a lighting source indicated generally by the reference character 20. Suitable means are employed for supporting the light source 20 relative to a reflector system 22. One form of such supporting means is described and claimed in applicant's copending application entitled "Lighting Fixture," Serial No. 674,397, filed July 26, 1957, and assigned to the assignee of the present application. The lighting source 20 then is arranged substantially centrally and longitudinally of the reflector system 22 as illustrated fully in the aforesaid copending application.

In this example of the invention, the reflector system 22 is formed with a plurality of discrete contiguous reflecting areas, all of which are cooperatively arranged to emit from the lighting fixture substantially all of the light received without directing the light in such a manner that it will impinge upon any part of an envelope 24 associated with the lighting source 20. Additional means including a refractor and an auxiliary reflector, associated with the reflecting system 22 and described hereinafter are provided for increasing the desired area of illumination and for directing portions of the light emitted from the source 20 to specific segments of the aforesaid area.

The reflector system 22 comprises a frontal ellipsoidal area A covering substantially the entire front end portion of the reflector 22, as indicated in Figs. 1 and 3 of the drawings. The reflecting section A is so formed that one of the foci thereof is disposed at or near the center 26 of the lighting source 20 while the other focus thereof is disposed at or near the auxiliary reflector 32 illustrated in Fig. 9 of the drawings and described presently. With this arrangement, of course, the minimum required area of the aforesaid auxiliary reflector is reduced in accordance with a basic principle of optics. As will be shown subsequently in connection with Fig. 9, the reflecting surface A is inclined generally relative to the longitudinal axis of the lighting source 20 such that substantially all of the light received thereat from the source 20 will be reflected downwardly from the light fixture without impinging on or passing through the envelope 24 of the source.

Disposed on each side of the reflector 22 and adjoining the aforedescribed reflecting surface A are a pair of reflecting surfaces B. The latter-mentioned reflecting surfaces are parabolic in contour and thus are each disposed to reflect the rays of light received from the source 20 in a parallel array. In one example of the invention employed for street-lighting applications, the reflecting surfaces are inclined generally downward such that the rays reflected from each of the surfaces are disposed as better shown in Fig. 4 of the drawings at an angle of 60° to the lamp nadir or vertical axis of the fixture. In street-lighting applications, this angle is desirably large but is limited by the disposition of the source 20 and its envelope 24. The main beams thus passing through the refractor 28 likewise arranged according to the invention and described hereinafter, then form the main beam elevations of the luminaire. The reflector sections B additionally are arranged, as shown in Fig. 4 of the drawings, such that substantially all of the light received thereby is directed downwardly and out of the lighting fixture without impinging upon the envelope 24 of the lighting source.

A third reflecting section C is disposed at the top of the reflector 22 and adjoins on three sides of the aforesaid reflecting areas A and B, respectively. The reflecting area C is not a regular curve but is designed arbitrarily to reflect the light received thereby over an area ranging between the aforesaid main beam elevations. That is to say, over an area subtending an angle from 60° left of nadir to 60° right thereof. The latter reflecting areas then operate to provide uniform lighting in that area lying between the main beam elevations. Moreover, as indicated by the ray traces of Fig. 5 of the drawings, the reflecting area C is further arranged such that substantially none of the light reflected thereby is intercepted by the envelope 24 of the lighting source 20.

The reflecting areas B and C are each further arranged, when the reflecting system 22 is employed in street-lighting arrangements, such that all of the light reflected therefrom is directed slightly outwardly into the street or in other words at an angle to the curb of the street. As better shown in Fig. 7 of the drawings, in one exemplary arrangement, these latter-mentioned rays are directed at an angle 20° to the horizontal transverse axis of the lighting fixture and appear to be parallel when viewed from the vertical transverse axis. The disposition of these light rays, including the main beam elevations reflected from the reflecting areas B and the rays intermediate thereof reflected from the areas C, is adapted to permit usage of the street-lighting fixture adjacent one side of the roadway. Moreover, the aforesaid angular disposition of these rays facilitates passage thereof around the envelope 24 of the lighting source and in furtherance of this purpose the lighting source 20 is mounted with its base at the curb side of the luminaire with the result that beam interference is minimized still further.

An additional reflecting surface D is provided atop the reflected system 22 and is disposed in this example directly over a major portion of the lighting source 20. The reflecting section D likewise is not a regular curve, but is designed to reflect light around the envelope 24 and against the main reflecting sections B disposed as described hereinbefore adjacent the lower edge at each side of the reflector 22. As better shown in Fig. 6 of the drawings, the light received by the reflecting sections D is transmitted to the reflecting sections B whence the rays are reflected in a substantially parallel array. As will be explained more fully hereinafter, these parallel rays are diffused or scattered to a predetermined extent by the refractor 28 in order to furnish additional lighting to those portions of the luminating area inwardly of but adjacent to the side extremities of the luminate area. As indicated heretofore, these side extremities are illuminated by the primarily reflected light, i.e., the light received directly from the source 20, and falling upon the reflecting surfaces B. The reflecting surface D is further arranged, as is also shown in Fig. 6, in a manner that substantially none of the light rays reflected therefrom to the main reflecting surface B impinges upon or pass through the envelope 24 of the light source 20.

When the reflector system 22 is employed in conjunction with a street-lighting fixture adapted for mounting adjacent one side of the street, the reflecting surfaces C and D are further arranged such that the light rays reflected thereby are apparently parallel when viewed along the horizontal transverse axis of the reflector 22 as in Fig. 8 of the drawings, and are directed downwardly and outwardly at an angle of approximately 20° to the vertical or nadir of the lamp. When the luminaire is arranged such that the base 30 of the light source 20 is disposed at the curb side of the street, these light rays therefore are directed outwardly into the street and means presently to be described are associated with the refractor 28 for distributing the aforesaid parallel rays to prescribed portions of the illuminated area.

As shown in Fig. 9, in order to provide additional lighting at an area directly across the street from the luminaire when it is used for the aforedescribed purpose, an auxiliary reflector 32 is provided. In this example of the invention, the auxiliary reflector 32 is substantially planar and is disposed as aforesaid, at or near one of the foci of the ellipsoidal reflecting surface A. The reflector 32 then operates in conjunction with the reflecting surface A of the reflecting system 22 to direct light rays in a diverging array to an area across the street and removed from the lighting fixture. These latter-mentioned rays, as emitted from the reflector 32 serve to extend the area illuminated by the lighting fixture in the longitudinal direction therefrom.

More importantly, the auxiliary reflector 32 performs the additional function of collecting that portion of the reflected light which would ordinarily spill out of the luminaire at the base or curb end thereof and which thus would serve no useful purpose when the luminaire is used in the aforesaid street-lighting application. It is contemplated that any desired surface can be imparted to the reflector 32 depending upon the area which is desired to be illuminated in this fashion and upon the disposition and form of the reflecting surfaces associated with the reflector system 22. For an example, when employed with the exemplary arrangement of the reflector system 22 described herein, the reflector 32 can be formed in parabolic contour, if it is desired to obtain substantially parallel light rays therefrom or in other contours if it is desired to impart other spatial distribution, to the light reflected from the auxiliary reflector 32.

Referring now more particularly to Figs. 4 to 6 and 8 of the drawings, an exemplary refractor system is shown therein in its contemplated arrangement for use with the aforedescribed reflector system 22. The refractor 28 is provided with a pair of opposed refracting areas F which are disposed individually adjacent the sides of the refractor. The refracting sections F are each provided with a plurality of upwardly directing prisms 34 extending substantially longitudinally on the inside surface of the refractor sections F. Accordingly, the prisms 34 are arranged to refract or lift the parallel rays received thereby from the main reflecting surfaces B of the reflector system approximately 10°. As a result, the main beam elevations of the luminairse, as better shown in Fig. 4, are directed at an angle of approximately 70° nadir. With this arrangement, then an increased illumination is provided along the length of the roadway when the luminaire is employed in street-lighting applications.

The refractor 28 is provided with an additional refracting section G which extends centrally and longitudinally thereof and which, in this example of the invention, is provided with a plurality of prisms 36 and 38, extending longitudinally along the inside surface of the refractor section G. The prisms 36 and 38 which are arranged in opposition to one another are extensions of the prismatic surfaces 34 of the refracting sections F respectively. As better shown in Fig. 6 of the drawings, the inner prismatic surface comprising the prisms 36 and 38 of the refracting section G is arranged to diverge the secondary reflection of the main reflecting surfaces B of the reflector 22. As indicated heretofore, this secondary reflection consists of that portion of the light which is received by the reflecting surface B from the reflecting surface D of the reflecting system 22. The secondary reflections of the main reflecting surfaces B, when diverged in this manner then extend over areas respectively adjacent to but inwardly of the portions illuminated by the primary reflections or main beam elevations of the surfaces B (Fig. 4). This divergence is accomplished by the opposite prismatic sections 36 and 38 of the refracting section G, the individual prisms of which are formed with decreasing height toward the center or lowermost point of the reflecting section G, as indicated in section 4.

As indicated in Fig. 5 of the drawings, the refracting sections G, together with the refracting sections F disposed adjacent thereto, serves the added function of further dispersing the diverging rays emitted from the reflecting surface C of the reflector system 22. As indicated heretofore, the reflecting surface C is an arbitrary curve which is designed to disperse or scatter the light received thereby in order to secure in conjunction with the aforesaid primary and secondary reflections of the surfaces B, a substantially uniformly illuminated area extending between and including the portions illuminated by the aforesaid main beam elevations. In furtherance of this purpose, the lower portions of the reflecting surface C are arranged to reflect a portion of the light received thereby in relatively concentrated form through the refracting section F, as indicated by the relatively closely spaced rays 40 of Fig. 5, where it falls more or less between those areas illuminated by the primary and secondary reflections of the main reflecting surfaces B. The remainder of the light rays emitted from the irregular surface C are less closely spaced as indicated by the rays 42 since they are directed to an illuminated area closer and more directly underneath the lighting fixture. Moreover, when refracted by the refracting sections F and G of the refractor 28, these latter-mentioned rays 42 are arranged to fall upon an area extending substantially from nadir to that illuminated by the secondary reflection from the opposing one of the main reflecting surfaces B, as indicated by a comparison of Figs. 4, 5 and 6 of the drawings.

As better shown in Fig. 8 of the drawings, the refracting section G is provided additionally with an outer prismatic surface consisting of a plurality of prisms 44 extending transversely of the refractor 28, that is to say, substantially at right angles to the inner prismatic sections 36 and 38 of the refracting section G. The outer prismatic surface of the refracting section G is arranged such that light rays passing therethrough are directed further outwardly into the roadway, when the luminaire is employed at the curb in street-lighting applications. In this example of the invention, all of the light reflected from the reflecting surface D, which constitutes as aforesaid the secondary reflection of the surfaces B, is refracted in this manner as indicated by the light rays 46. On the other hand, the light rays 48 reflected from the major portion of the reflecting surface C pass through the frontal, substantially non-refracting section H of the refractor 28. In this manner, the combined light rays emitted from the adjacent reflecting surfaces C and D of the reflector 22 are converged slightly at those illuminated areas relatively further removed from the luminaire and disposed adjacent the opposite side of the street.

From the foregoing, it will be apparent that a novel and efficient optical system for a luminaire has been disclosed herein. When employed in street-lighting applications, the luminaire is arranged in accordance with the invention to minimize spill lighting and to provide a greater area of illumination along the length of the roadway. Upon disposing the luminaire at one side of the street, in accordance with one application of the invention the spill lighting minimizing means serves the additional function of directing a part of the light emitted from the luminaire to areas adjacent the opposite side of the street. Although the reflecting and refracting systems discussed by the invention are described in exemplary street-lighting applications, obviously the invention is not so limited.

Consequently, numerous modifications of the invention will occur to those skilled in the art without departing from the spirit and scope of the invention. Moreover, it is to be understood that certain features of the invention can be employed without a corresponding use of other features.

Accordingly, what is claimed as new is:

1. An optical system comprising a one-piece ovate reflector having opposite sides, opposite ends, a top portion and a bottom opening, an elongated light source in said reflector extending from one of said ends, said reflector having a pair of laterally opposed reflecting surface means disposed generally along said opposite sides for reflecting light beneath said source and generally toward the other one of said ends, said reflector having a first irregularly curved reflecting surface means disposed generally centrally of said top portion and above said source for reflecting substantially all of the light emitted from said source on to said first surface means around said source and on to said opposed surface means, and said reflector having a second irregularly curved reflecting surface means disposed generally along said top portion surrounding said first irregularly curved surface means and joining said opposed surface means for reflecting light downwardly below said source and generally toward said other one of said ends.

2. An optical system comprising a one-piece ovate reflector having opposite sides, opposite ends, a top portion and a bottom opening, an elongated light source in said reflector extending from one of said ends, said reflector having a pair of laterally opposed parabolic reflecting surface means disposed generally along said opposite sides for reflecting light beneath said source and generally toward the other one of said ends, said reflector having a first irregularly curved reflecting surface means disposed generally centrally of said top portion and above said source for reflecting substantially all of the light emitted from said source on to said first surface means around said source and on to said parabolic surface means, said reflector having a second irregularly curved reflecting surface means disposed generally along said top portion surrounding said first surface means and joining said parabolic surface means for reflecting light downwardly below said source and generally toward said other one of said ends, said reflector having an ellipsoidal reflecting surface means along said other one of said ends and terminating in opposite sides, top and bottom edges, the side edges joining said parabolic surface means and the top edge joining said second surface means, the top edge of said ellipsoidal surface means being disposed relatively closer to said source than the bottom edge thereof so that said ellipsoidal surface means is inclined with respect to the longitudinal axis of said source for reflecting light below said source.

3. An optical system comprising a one-piece ovate reflector having opposite sides, opposite ends, a top portion and a bottom opening, an elongated light source in said reflector extending from one of said ends, said reflector having a pair of laterally opposed parabolic reflecting surface means disposed generally along said opposite sides for reflecting light beneath said source and generally toward the other one of said ends, said reflector having a first irregularly curved reflecting surface means disposed generally centrally of said top portion and above said source for reflecting substantially all of the light emitted from said source on to said first surface means around said source and on to said parabolic surface means, said reflector having a second irregularly curved reflecting surface means disposed generally along said top portion surrounding said first surface means and joining said parabolic surface means for reflecting light downwardly below said source and generally toward said other one of said ends, said reflector having an ellipsoidal reflecting surface means along said other one of said ends and terminating in opposite side, top and bottom edges, the side edges joining said parabolic surface means and the top edge joining said second surface means, the top edge of said ellipsoidal surface means being disposed relatively closer to said source than the bottom edge thereof so that said ellipsoidal surface means is inclined with respect to the longitudinal axis of said source for reflecting light below said source, and an auxiliary reflector means extending below said source and located at a focus of said ellipsoidal surface means for substantially reversing the direction of the light reflected from said ellipsoidal surface means.

4. An optical system comprising a one-piece ovate reflector having opposite sides, opposite ends, a top portion and a bottom opening, an elongated light source in said reflector extending from one of said ends, said reflector having a pair of laterally opposed parabolic reflecting surface means disposed generally along said opposite sides for reflecting light beneath said source and generally toward the other one of said ends, said reflector having a first irregularly curved reflecting surface means disposed generally centrally of said top portion and above said source for reflecting substantially all of the light emitted from said source on to said first surface means around said source and on to said parabolic surface means, and said reflector having a second irregularly curved reflecting surface means disposed generally along said top portion surrounding said first irregularly curved surface means and joining said parabolic surface means for reflecting light downwardly below said source and generally toward said other one of said ends, and an ovate refractor having an open top mating with said reflector bottom opening, said refractor having a first prismatic surface means for diverging certain of the light passing therethrough and a second prismatic surface means for refracting certain of the light passing therethrough in a direction generally toward said other one of said ends of the reflector but inclined downwardly therefrom.

References Cited in the file of this patent

UNITED STATES PATENTS

| | | |
|---|---|---|
| 1,398,987 | Weems | Dec. 6, 1921 |
| 1,753,885 | Gerhardt | Apr. 8, 1930 |
| 2,260,693 | Rolph | Oct. 28, 1941 |
| 2,721,931 | Franck | Oct. 25, 1955 |
| 2,739,226 | Rex | Mar. 20, 1956 |
| 2,786,130 | Elmer | Mar. 19, 1957 |

FOREIGN PATENTS

| | | |
|---|---|---|
| 338,740 | Italy | Mar. 31, 1936 |